(No Model.)

A. VOGELSANG.
PROPULSION OF VESSELS BY HYDRAULIC REACTION.

No. 469,328. Patented Feb. 23, 1892.

Witnesses.

Inventor:

UNITED STATES PATENT OFFICE.

ALEXANDER VOGELSANG, OF BROOKLYN, NEW YORK.

PROPULSION OF VESSELS BY HYDRAULIC REACTION.

SPECIFICATION forming part of Letters Patent No. 469,328, dated February 23, 1892.

Application filed February 27, 1891. Serial No. 383,073. (No model.)

*To all whom it may concern:*

Be it known that I, ALEXANDER VOGELSANG, a citizen of the United States of America, a resident of Brooklyn, in the State of New York, at present residing in Tegernsee, Bavaria, in the Empire of Germany, have invented new and useful Improvements in the Propulsion of Ships and in Apparatus Therefor, of which the following is a specification.

My invention relates to the propulsion of ships or vessels by means of hydraulic reaction, or what has commonly been termed "jet propulsion." Hitherto the water has been discharged through conduits having only one discharge-outlet each, and while the vessel was under way on a certain course such outlets were kept stationary, thus constantly discharging the water in one line of direction, or water against water having already acquired great velocity in the same direction, whereby the water within the conduit also acquired considerable velocity relative to still water, causing an enormous waste of power and fuel and no resultant reaction to be of any benefit. By other methods tried, in order to obtain great pressures by means of devices within the vessel the discharge-conduit was considerably contracted at the outlet. Such methods proved failures, there being a great waste of power, because the pressure was principally brought to bear upon parts of the vessel itself and it permitted the water to escape through the small outlet at a frightful velocity, from which no resultant reaction could be obtained.

I use in carrying out my invention any suitable pump or water-forcing device with a discharge-conduit having two or more submerged outlets or nozzles at its extremity. These outlets I arrange in such a manner that they may be revolved around an axis and move in circular paths, in order that the water from the motor shall constantly come in contact with the undisturbed water immediately at the outlets and not act long enough against any one point of the exterior water to cause the same to be forced back materially from the outlets, whereby the water within the conduit is prevented from leaving the same with any material velocity relative to still water.

To enable my invention to be fully understood, I will describe the same with reference to the accompanying drawings, in which—

Figure 1:
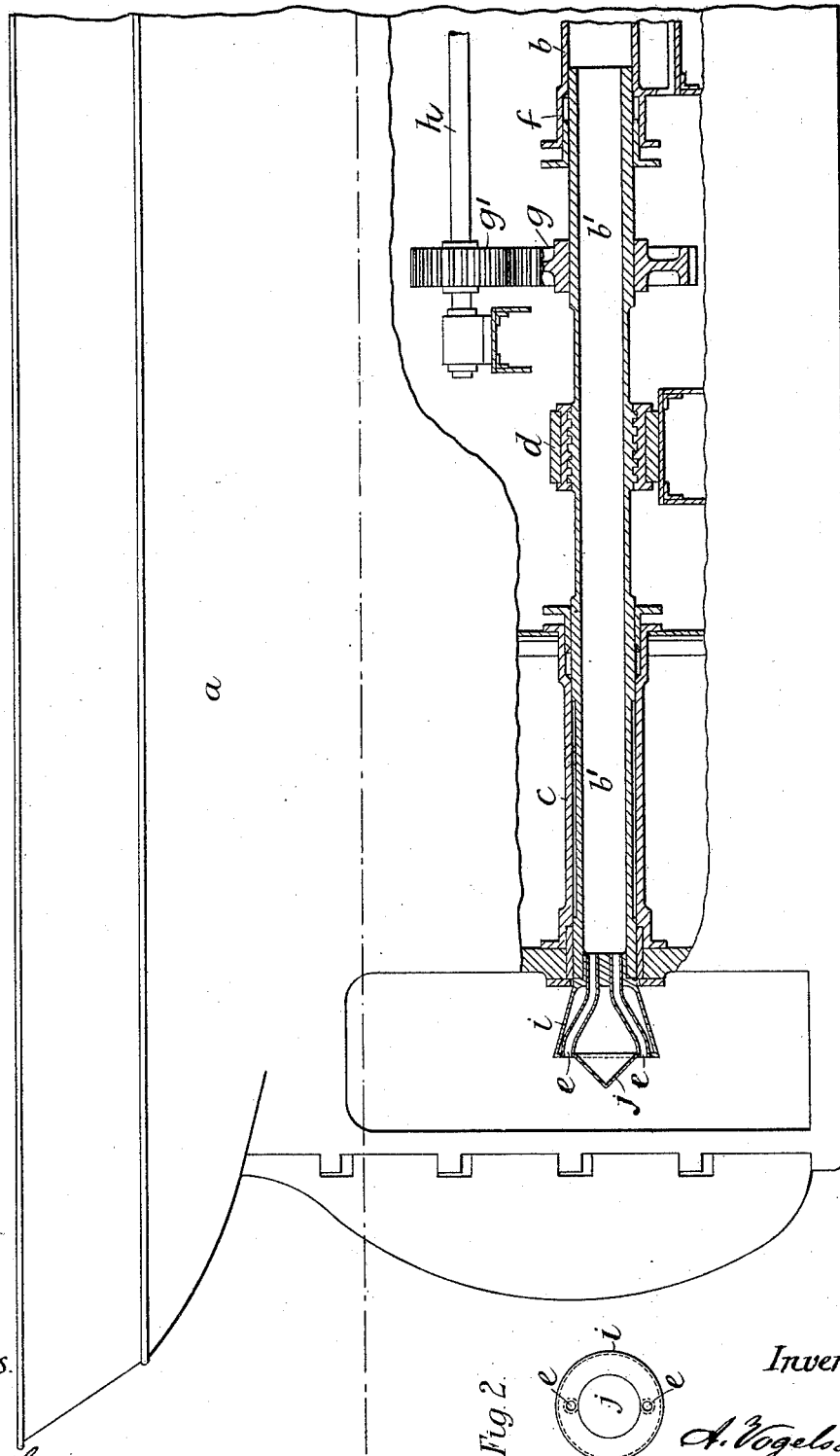
Figure 2:
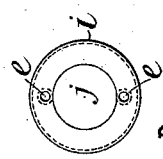

Figure 1 represents in sectional side elevation so much of a ship or vessel as is necessary to illustrate the application of my invention thereto. Fig. 2 is an end view of the nozzles and their casing, hereinafter referred to.

$a$ indicates the hull of the vessel, and $b$ represents a pipe, which communicates with a motor for raising and discharging water.

$b'$ is a pipe, which forms a continuation of the pipe $b$ and which is mounted in a stern tube $c$ and thrust-bearing similarly to the ordinary propeller-shaft of a steamship, in order that it can be rotated.

$e\ e$ are tubes or nozzles projecting from the outer end of the pipe $b'$ and serving to cause the water forced through the said pipe to act against the exterior water immediately at the outlets like a solid mass pressing constantly against a solid wall, the said nozzles being equidistant from the axis of the pipe $b'$ and diametrically opposite each other in order to balance the pressure, as shown most clearly in Fig. 2.

$f$ is a stuffing-box for making a water-tight joint between the pipes $b$ and $b'$.

$g\ g'$ are gear-wheels, the former of which is secured to the pipe $b'$ while the latter is secured to a shaft $h$, to which rotary motion is imparted by any suitable motor, in order to cause the rotation of the pipe $b'$.

$i$ is a casing, which surrounds the nozzles $e$ and serves to prevent the same from being damaged by contact with anything floating in the water, and $j$ is a cone placed between the nozzles to prevent the formation of a partial vacuum as the vessel moves through the water.

The operation of the apparatus is as follows—that is to say, water is forced through the pipes $b\ b'$ to the submerged discharge-outlets and at the same time rotary motion is imparted to the pipe $b'$, causing the outlets or nozzles to revolve, whereby the exterior water immediately at the outlets is not acted upon at any one point for a sufficient length of time to cause it to be forced back materially from the outlets. The faster the nozzles are revolved the greater becomes the resistance from the exterior water immediately at the discharge-outlets and the greater will be the reaction.

In the drawings I have only shown two nozzles applied to pipe b', but it is understood that any number of nozzles may be applied.

In the drawings the discharge-orifices point in a direction parallel to the longitudinal axis of the vessel. I prefer, however, to point them at an angle thereto against the direction of rotation and opposite to the vessel's motion.

Although I have described only a single series of outlets or nozzles it is obvious that two or more series may be employed. It is also obvious that suitable outlets are employed—for instance, at the bows of the vessel and at other suitable parts in a well-known manner—in order to facilitate the rapid maneuvering of the vessel independently of the rudder.

Of course it will be understood that my described improvement may be duplicated in a vessel, and one set may be on each side of the stern or at other parts of the vessel.

I have heard that others have proposed to have the blades in screw-propellers made hollow and the shaft hollow, and to force water through the shaft into the blades and out of these for the purpose of revolving or assisting to revolve the propeller. I make no claim whatever to such a combination.

Having now particularly described and ascertained the nature of my said invention and in what manner the same is to be performed, I declare that what I claim is—

1. The improvements in the propulsion of ships or vessels by means of hydraulic reaction, consisting in the combination of a suitable pump or water-forcing device having water-discharge pipe with two or more submerged outlets or nozzles at its extremity, and means for rotating said discharge pipe or section thereof, so as to cause the water outlets or nozzles to revolve around a common axis, substantially as set forth.

2. The improvements in the propulsion of ships or vessels by means of hydraulic reaction, consisting in combining with two or more submerged discharge-outlets a rotating pipe at whose extremity the outlets are connected, and means for rotating the pipe and nozzles, whereby when water is forced through the pipe to the outlets and the pipe is set rotating and the outlets are revolving such water will constantly come in contact with comparatively undisturbed water and by the rotation will not act long enough against any one point of the surrounding water to cause the same to be forced back materially from the outlets, and whereby the water is prevented from leaving the outlets with any great velocity relative to still water, substantially as described.

ALEXANDER VOGELSANG.

Witnesses:
JOHN E. BOUSFIELD,
*Of the firm of G. F. Redfern & Co., 4 South Street, Finsbury, London, Patent Agents.*
W. C. BROKENSHIRE.